US010189327B2

United States Patent
Suissa et al.

(10) Patent No.: US 10,189,327 B2
(45) Date of Patent: Jan. 29, 2019

(54) SPRING MODULE WITH NEGATIVE AND POSITIVE STIFFNESS SPRINGS

(71) Applicant: GM GLOBAL TECHNOLOGY OPERATIONS LLC, Detroit, MI (US)

(72) Inventors: Avshalom Suissa, Kiryat Ono (IL); Vladimir Suplin, Modiin (IL)

(73) Assignee: GM Global Technology Operations LLC, Detroit, MI (US)

( * ) Notice: Subject to any disclaimer, the term of this patent is extended or adjusted under 35 U.S.C. 154(b) by 109 days.

(21) Appl. No.: 15/433,277

(22) Filed: Feb. 15, 2017

(65) Prior Publication Data

US 2018/0229568 A1    Aug. 16, 2018

(51) Int. Cl.
| | | |
|---|---|---|
| *B60G 15/06* | (2006.01) | |
| *B60G 11/00* | (2006.01) | |
| *F16F 1/00* | (2006.01) | |

(52) U.S. Cl.
CPC ............ *B60G 15/065* (2013.01); *B60G 11/00* (2013.01); *F16F 1/00* (2013.01); *B60G 2200/144* (2013.01); *B60G 2202/10* (2013.01); *B60G 2202/31* (2013.01)

(58) Field of Classification Search
CPC  B60G 15/065; B60G 15/067; B60G 2202/31; B60G 2200/144
See application file for complete search history.

(56) References Cited

U.S. PATENT DOCUMENTS

| | | | | | |
|---|---|---|---|---|---|
| 2,263,107 | A * | 11/1941 | Smirl | ..................... | B60G 11/00 267/2 |
| 5,150,886 | A * | 9/1992 | Hamberg | ............... | B60G 13/16 267/140.4 |
| 8,899,393 | B2 * | 12/2014 | Kraner | .................. | G05B 19/404 188/266.7 |
| 9,920,793 | B1 * | 3/2018 | Churchill | .................. | F16D 7/00 |
| 2013/0069293 | A1 * | 3/2013 | Ito | .......................... | B60G 11/16 267/221 |
| 2013/0233998 | A1 * | 9/2013 | Bueter | .................. | F16F 7/1005 248/566 |
| 2015/0136937 | A1 * | 5/2015 | Xu | ......................... | F16F 15/022 248/566 |
| 2015/0165852 | A1 * | 6/2015 | Suissa | .................... | B60G 11/56 280/124.106 |
| 2015/0204413 | A1 * | 7/2015 | Churchill | .............. | F16F 15/022 248/550 |
| 2016/0347144 | A1 * | 12/2016 | Suissa | ................ | B60G 17/0165 |
| 2018/0195571 | A1 * | 7/2018 | Churchill | .................. | F16F 1/22 |

FOREIGN PATENT DOCUMENTS

DE            3608934 A1 *   9/1987   ............. B60G 11/48

* cited by examiner

*Primary Examiner* — Darlene P Condra

(74) *Attorney, Agent, or Firm* — Quinn IP Law

(57) ABSTRACT

A strut assembly for a suspension corner employed in a vehicle having a vehicle body and a road wheel includes a damper. The strut assembly also includes an elastic unit having at least one spring module acting in concert with the damper to suspend the vehicle body relative to the road wheel. Each spring module has a positive stiffness spring arranged in parallel with a negative stiffness spring. A vehicle that has a suspension corner employing the elastic unit and is configured to maintain contact between the road wheel and the road surface and provide isolation of vibration between the road wheel and the vehicle body is also contemplated.

18 Claims, 5 Drawing Sheets

SPRING MODULE WITH NEGATIVE AND POSITIVE STIFFNESS SPRINGS

INTRODUCTION

The present disclosure relates to a spring module using positive and negative stiffness springs for use in a vehicle suspension.

Contemporary on- and off-road going vehicles typically employ suspension systems that generally include a system of springs, shock absorbers, and linkages that connect a vehicle body to the vehicle's wheels. Because the majority of forces acting on the vehicle body are transmitted through contact patches between the road and the tires, one of the main objectives of a vehicle suspension is to maintain the contact between the vehicle's road wheels and the road surface.

Vehicle suspension systems generally contribute to the vehicle's road-holding/handling and braking, as well as provide comfort and reasonable isolation from road noise, bumps, and vibrations to the vehicle occupants. Because these objectives are generally at odds, the tuning of suspensions involves finding a compromise that is appropriate to each vehicle's intended purpose. For example, a suspension for a sporting vehicle may be tuned to give up some ride comfort in return for enhanced vehicle response, while a suspension for a luxury vehicle may be tuned for the opposite outcome. Such suspensions typically employ springs and dampers that cooperate to achieve a desired suspension tuning.

SUMMARY

A strut assembly for a suspension corner employed in a vehicle having a vehicle body and a road wheel includes a damper. The strut assembly also includes an elastic unit having at least one spring module acting in concert with the damper to suspend the vehicle body relative to the road wheel. Each spring module has a positive stiffness spring arranged in parallel with a negative stiffness spring.

The positive stiffness spring may be a Belleville spring segment and the negative stiffness spring may be a buckling beam segment.

The elastic unit may include a plurality of spring modules arranged in a stack and interspaced along the strut assembly.

In the stack of the plurality of spring modules, adjacent Belleville spring segments may be arranged in contact with one another and transfer forces between adjacent spring modules.

The Belleville spring segment may be secured to the buckling beam segment in the at least one spring module.

Each of the Belleville spring segment and the buckling beam segment may be defined by a respective external diameter. Additionally, the Belleville spring segment and the buckling beam segment may be spaced apart and secured to one another at the respective external diameters.

The strut assembly may additionally include a housing. Each of the at least one spring modules may include an annular bracket configured to secure the Belleville spring segment and the buckling beam segment at the respective external diameters. Also, the housing may be configured to guide the annular bracket.

The buckling beam segment may include an outer ring portion defined by the respective external diameter and an inner ring portion connected by a plurality of buckling beam elements. The Belleville spring segment may include Belleville spring fingers in contact with and configured to slide with respect to the inner ring portion.

The strut assembly may also include a rod configured to actuate the damper, while the inner ring portion of the buckling beam segment may define an aperture. In such an embodiment, the rod may extend through the aperture.

The buckling beam segment may include two adjacent beams having respective bends configured to oppose one another and counter a positive stiffness of the Belleville spring segment.

Also disclosed is a vehicle having a vehicle body, a road wheel, and a suspension corner connecting the road wheel to the vehicle body. The suspension corner is configured to maintain contact between the road wheel and the road surface and provide isolation of vibration between the road wheel and the vehicle body. The suspension corner employs an elastic unit having a spring module that includes a positive stiffness spring arranged in parallel with a negative stiffness spring, as described above.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
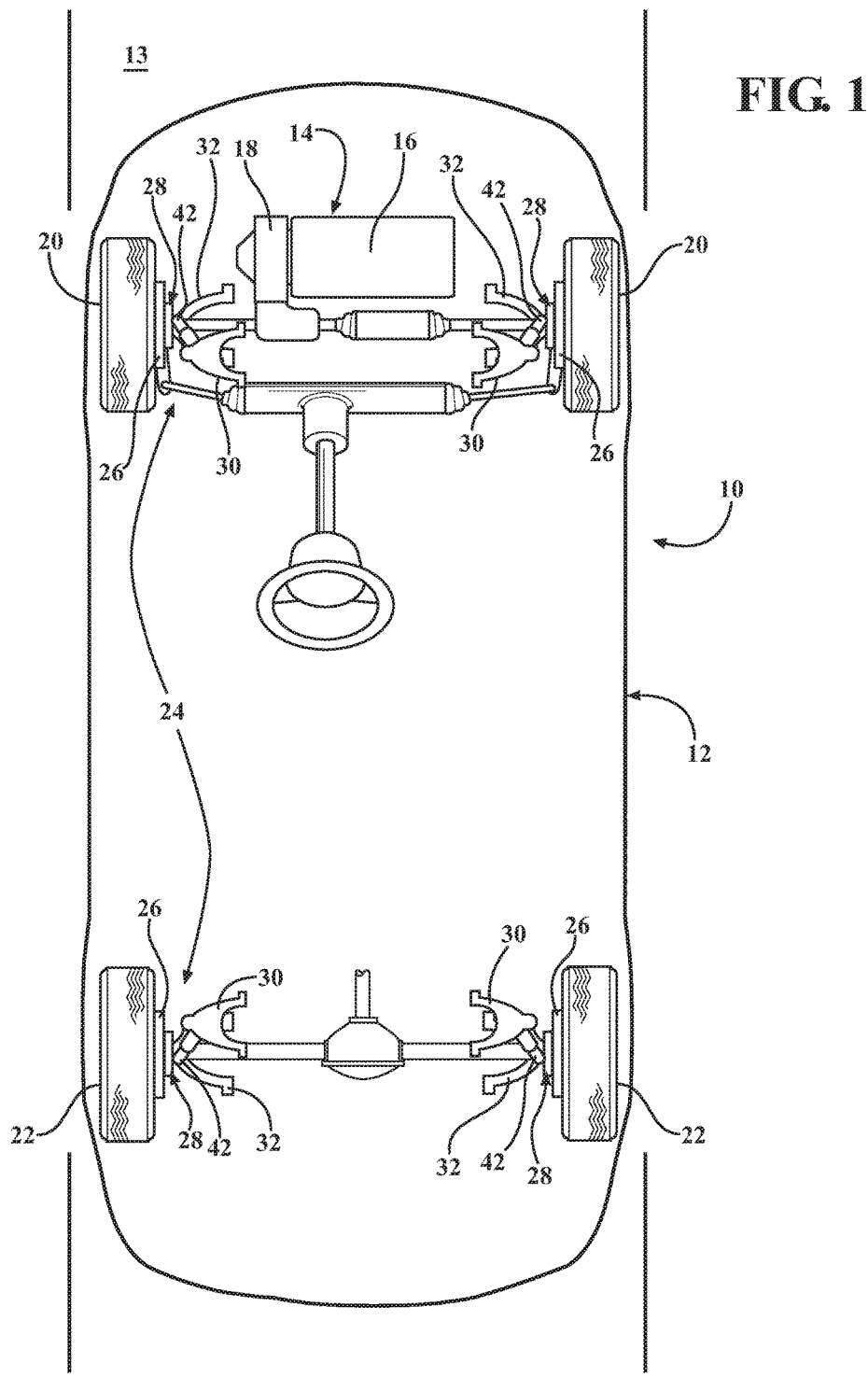
FIG. 1 is a plan view of a motor vehicle having a suspension system according to the disclosure.

Referring to the drawings, wherein like reference numbers refer to like components, FIG. 1 shows a schematic view of a motor vehicle 10, which includes a vehicle body 12. The vehicle 10 also includes a powertrain 14 configured to propel the vehicle. As shown in FIG. 1, the powertrain 14 includes an engine 16 and a transmission 18. The powertrain 14 may also include one or more motor/generators and a fuel cell, neither of which are shown, but a powertrain configuration employing such devices would be appreciated by those skilled in the art.

The vehicle 10 also includes a plurality of road wheels that include front wheels 20 and rear wheels 22. Although four wheels, i.e., a pair of front wheels 20 and a pair of rear wheels 22, are shown in FIG. 1, a vehicle with fewer or greater number of wheels is also envisioned. As shown, a vehicle suspension system 24 operatively connects the body 12 to the front and rear wheels 20, 22 for maintaining contact between the wheels and a road surface 13, and for maintaining handling of the vehicle. The suspension system 24 includes a plurality of knuckles 26, each configured to support a respective road wheel 20, 22 via a wheel hub and bearing assembly (not shown). Each knuckle 26 may be operatively connected to the body 12 via an upper control arm 30 and a lower control arm 32.

Figure 2:
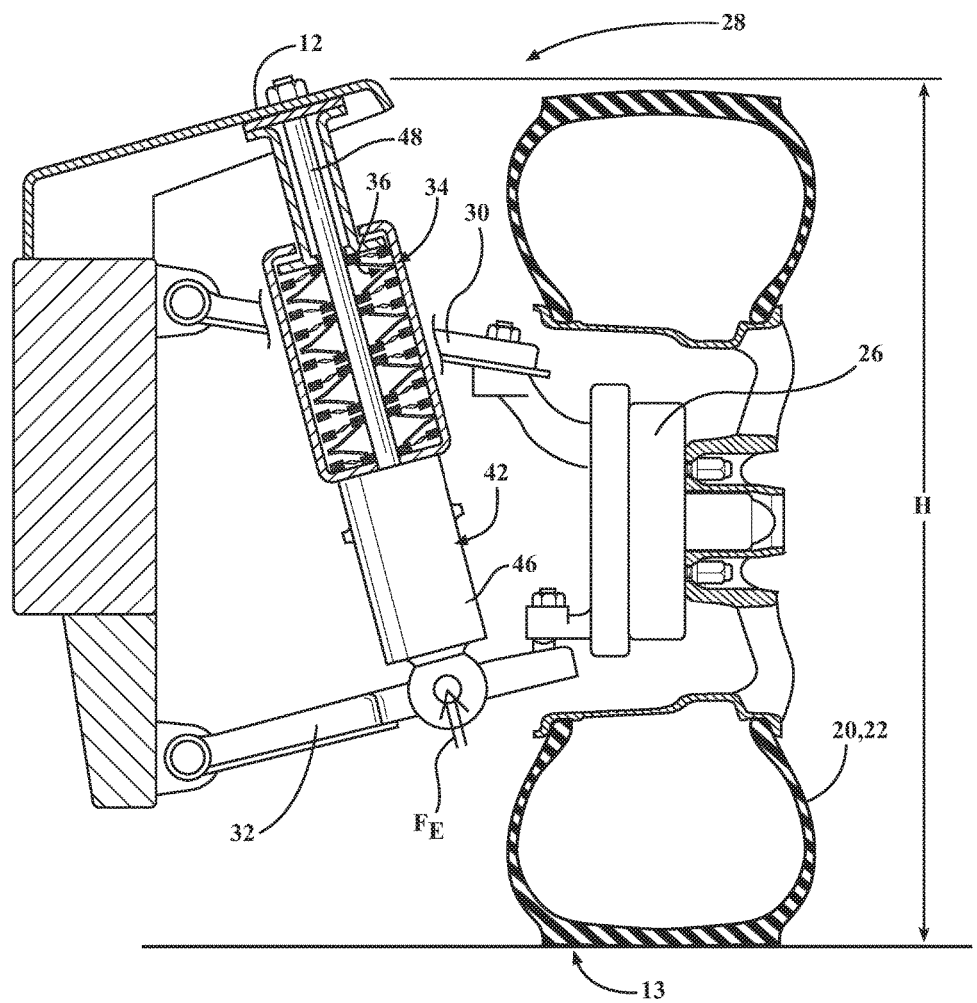
FIG. 2 is an enlarged schematic cross-sectional illustration of a representative suspension corner of the vehicle shown in FIG. 1, having a strut assembly employing an elastic unit with a plurality of spring modules according to the disclosure.
Figure 3:
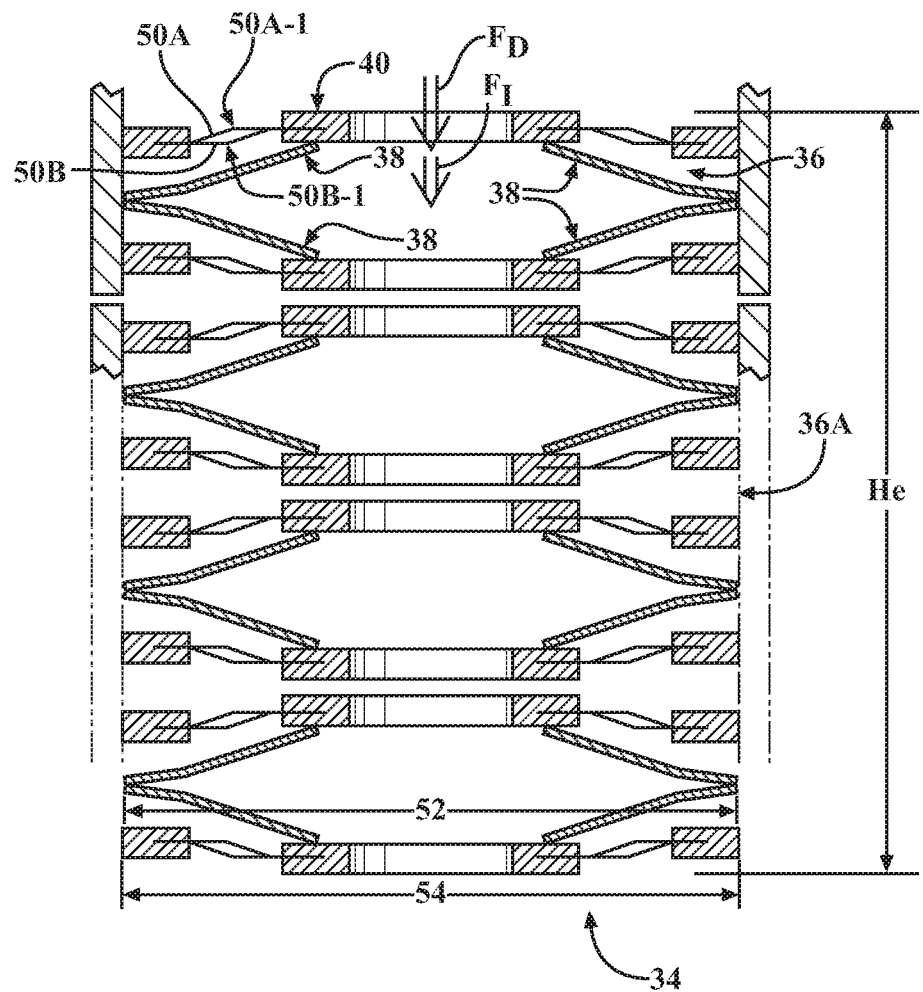
FIG. 3 is a schematic illustration of a specific embodiment of a stack of spring modules shown in FIG. 2.

FIG. 2 depicts a representative corner 28 of the suspension system 24, which includes a representative knuckle 26. Although a specific configuration of the suspension system 24 is shown in FIGS. 2-3, other vehicle suspension designs are also envisioned. Accordingly, each suspension corner 28 connects its respective road wheel 20, 22 to the vehicle body 12 and is configured to maintain contact between the subject road wheel and the road surface 13. As also shown in FIG. 2, each individual suspension corner 28 establishes a specific height H of the vehicle body 12 relative to the road surface 13, i.e., vehicle ride height. Furthermore, each suspension corner 28 provides isolation of vibration between the respective road wheel 20, 22 and the vehicle body 12, and attenuation of excitation forces $F_E$ from the road surface 13, for example generated by various road imperfections and undulations, such as bumps and potholes.

With continued reference to FIG. 2, the representative suspension corner 28 includes an elastic unit 34 having at least one spring module 36 and is configured to suspend the vehicle body 12 relative to the respective road wheel 20, 22. Although four spring modules 36 are depicted as part of the elastic unit 34, the number of such spring modules employed in a specific elastic unit 34 can be as few as one or a plurality thereof. Specifically, the elastic unit 34 can include as many spring modules 36 as deemed appropriate to tune response characteristics of the particular suspension corner 28 for a subject vehicle 10. The elastic unit 34 has a height $H_e$ that is established primarily by the number of the spring modules 36 included therein.

Each spring module 36 includes a positive stiffness spring 38 arranged in parallel with a negative stiffness spring 40. As employed herein, a positive stiffness spring 38 has a spring rate with positive slope and is defined as a spring member which generates an increasing force $F_I$ over the spring's compression travel and along the height $H_e$ of the elastic unit 34. On the other hand, as also defined herein, the negative stiffness spring 40 is configured to generate a decreasing force $F_D$ has a spring rate with negative slope, as opposed to the positive slope of the positive spring 38, over the spring's compression travel and along the height $H_e$ of the elastic unit 34 as the subject spring undergoes further deformation along the height $H_e$. The negative stiffness spring 40 may be configured to generate a predetermined force at static vehicle ride height H (shown in FIG. 4). The negative stiffness spring 40 will then generate a decreasing force $F_D$ as the subject spring becomes sufficiently depressed under additional load W on the vehicle body 12 or in response to excitation from the road surface 13 (shown in FIG. 5).

With resumed reference to FIG. 2, the representative suspension corner 28 may include a strut assembly 42 configured to attach the road wheel 20, 22 to the vehicle body 12. The strut assembly 42 includes a housing 44 mounted to the lower control arm 32. The elastic unit 34 may be configured as an integral component of the strut assembly 42, i.e., the elastic unit 34 may be mounted to and incorporated into the strut. As shown, the elastic unit 34 is retained within the housing 44 and suspends and elastically transfers the weight of the vehicle body 12 to the respective wheel 20, 22 and also filters the excitation forces $F_E$ between the road surface 13 and the vehicle body. The elastic unit 34 may include a plurality of spring modules 36 arranged in a stack 36A (shown in FIGS. 3 and 3A) and interspaced along the strut assembly 42.

The strut assembly 42 also includes a damper 46 retained by the housing 44 therein and configured to attenuate compression and rebound oscillations of the elastic unit 34 as the vehicle 10 traverses the road surface 13. The damper 46 is actuated by a rod 48 that extends through the housing 44 and is operatively connected to the vehicle body 12. The knuckle 26 has its motion controlled in response to road input by the elastic unit 34 and the damper 46, which cushion or dampen the excitation forces $F_E$ being generated at the specific wheel 20, 22 as the vehicle 10 traverses the road surface 13. Accordingly, the strut assembly 42 is configured to control motion of the respective wheel 20, 22 during operation of the vehicle 10 and provide desired ride comfort and vehicle response.

As shown in FIGS. 3-6, the positive stiffness spring 38 may be a Belleville spring segment and the negative stiffness spring 40 may be a buckling beam segment. In the stack 36A of the plurality of spring modules 36, adjacent Belleville spring segments may be arranged in contact with one another and transfer forces between adjacent spring modules 36. As shown, in each individual spring module 36, the Belleville spring segment may be secured to the buckling beam segment. Each Belleville spring segment is configured to generate a relatively constant positive stiffness or spring constant and the resultant increasing force $F_I$ in a compact package over the range of compression of the strut assembly 42.

Each buckling beam segment includes two adjacent beams 50A and 50B. The adjacent beams 50A, 50B include specific profiles having respective bends 50A-1 and 50B-1 that oppose or substantially mirror one another to generate a shift from zero or minimal positive force to negative $F_N$ during operation of the strut 42 over undulations of the road surface 13. Specifically, the combination of the adjacent beams 50A and 50B is configured to generate the negative stiffness, i.e., commence generating the decreasing force $F_N$ opposite to the increasing force $F_I$ of the Belleville spring segment, once the adjacent beams have been buckled via being sufficiently depressed along the length of the strut assembly 42 in the direction of the road surface 13. In other words, the respective bends 50A-1 and 50B-1 of the two adjacent beams 50A and 50B are configured to counter a positive stiffness and the resultant increasing force $F_I$ of the Belleville spring segment to thereby reduce the overall stiffness of the elastic unit 34 over the range of compression of the strut assembly 42.

Figure 4:
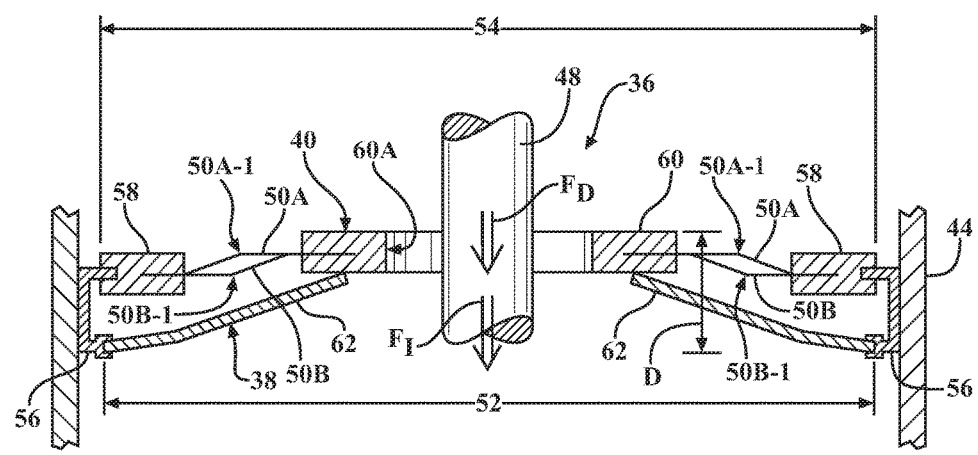
FIG. 4 is a schematic illustration of the representative spring module shown in FIG. 3, wherein the spring module is shown in a set position under predetermined vehicle weight.

With reference to FIG. 3, each of the Belleville spring segment embodiment of the positive stiffness spring 38 and the buckling beam segment embodiment of the negative stiffness spring 40 may be defined by a respective external diameter, i.e., a Belleville spring external diameter 52 and a buckling beam external diameter 54. As shown in FIG. 4, the Belleville spring segment and the buckling beam segment may also be spaced apart and secured to one another at the respective external diameters 52, 54. Specifically, each spring module 36 may include an annular bracket 56 configured to secure the Belleville spring segment and the buckling beam segment at the respective external diameters 52, 54. The annular bracket 56 may also establish appropriate separation or distance D between the Belleville spring segment and the buckling beam segment in the particular spring module 36, such that the specific distances D for the spring modules in the elastic unit 34 facilitate appropriate vehicle ride height H.

Figure 3A:
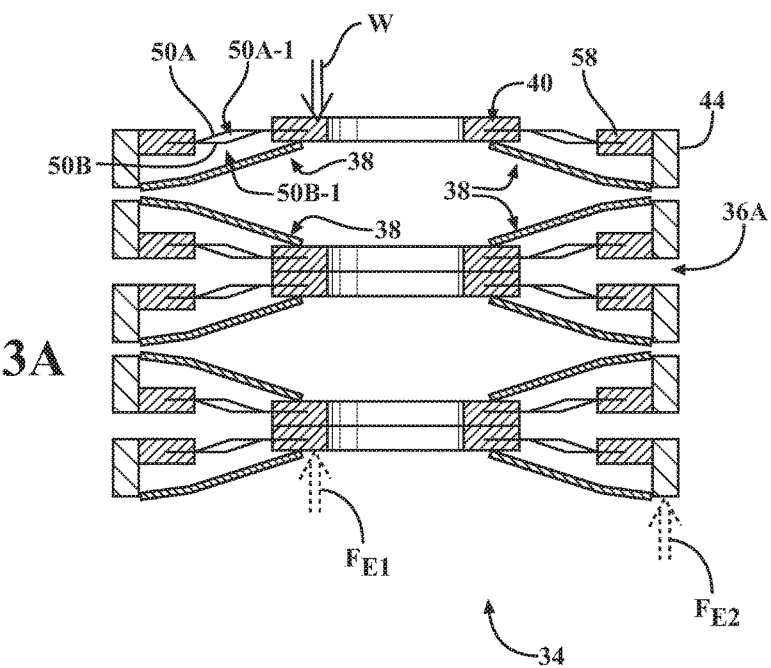
FIG. 3A is a schematic illustration of another embodiment of a stack of spring modules shown in FIG. 2.

The housing 44 may also be configured to slidingly guide the annular bracket 56 during actuation of the elastic unit 34. As identified in FIGS. 4-6, the buckling beam segment may include an outer ring portion 58 defined by the respective external diameter 54 and an inner ring portion 60. In the subject embodiment, the outer ring portion 58 and the inner ring portion 60 are connected by multiple pairs of adjacent beams 50A and 50B. The Belleville spring segment includes multiple Belleville spring fingers 62 in contact with and configured to slide with respect to the inner ring portion 60, as shown and identified in FIGS. 4-6. The inner ring portion 60 of the buckling beam segment may define an aperture 60A, such that the rod of the 48 of the damper 46 extends through the aperture. Another embodiment of the stack 36A of spring modules 36 is shown in FIG. 3A. In FIG. 3A, the excitation forces $F_E$ being generated at the specific wheel 20, 22 as the vehicle 10 traverses the road surface 13 may be directed to the spring modules 36 either through the negative stiffness spring 40, specifically shown as excitation force $F_{E1}$, or through the outer ring portion 58, shown as excitation force $F_{E2}$.

Figure 5:
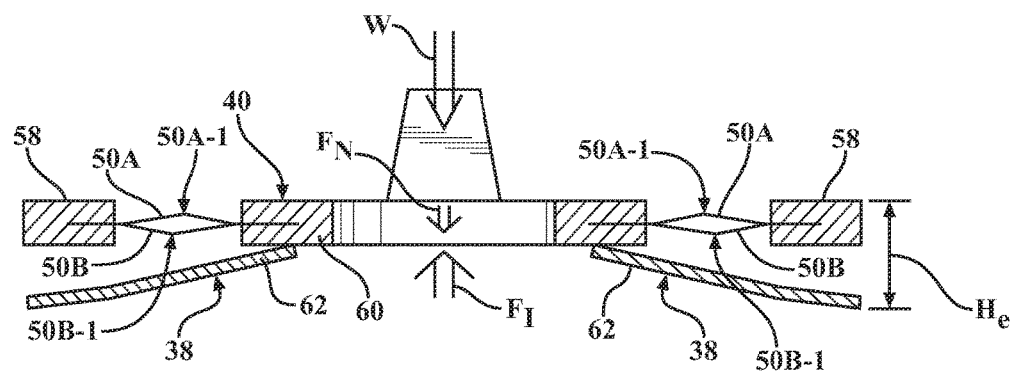
FIG. 5 is a schematic illustration of the representative spring module shown in FIG. 3, wherein the spring module is shown in a depressed position under increased vehicle weight or in response to excitation from a road surface.
Figure 6:
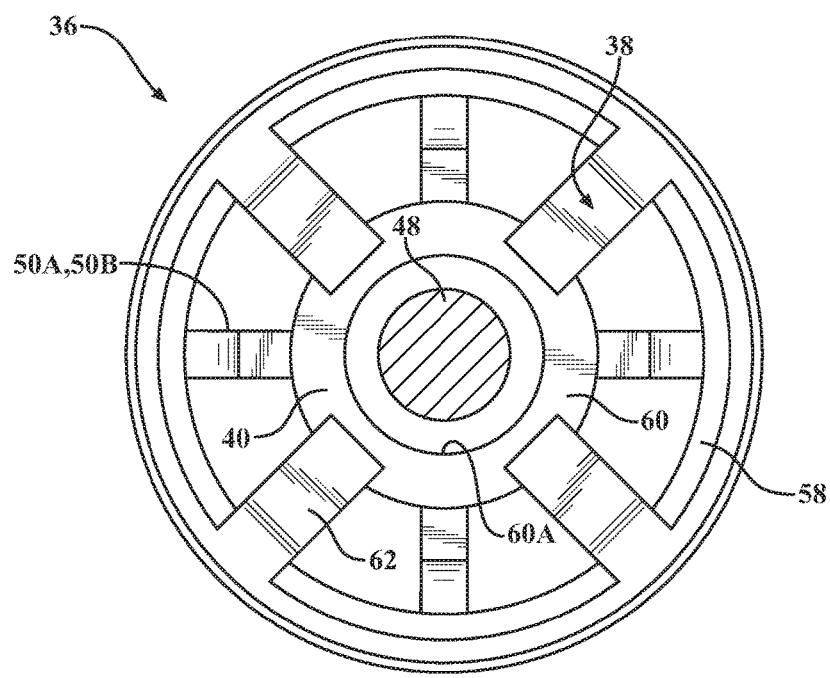
FIG. 6 is a schematic top view of the representative spring module shown in FIGS. 3-5.

Accordingly, the suspension system 24 employing elastic units 34 may achieve a mechanically maintained vehicle ride height H under a predetermined load W, such as the weight of the vehicle body 12 (shown in FIG. 5). Additionally, the effective spring rate of the elastic units 34 may be reduced when subjected to additional compression forces, for example when the vehicle is loaded with cargo or in response to excitation from the road surface 13. Such reduced effective spring rate of the elastic unit 34 under additional loading and compression is intended to facilitate enhanced ride quality of the vehicle 10.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. A strut assembly for a suspension corner employed in a vehicle having a vehicle body and a road wheel, the strut assembly comprising:
    a damper; and
    an elastic unit having at least one spring module acting in concert with the damper to suspend the vehicle body relative to the road wheel, wherein the at least one spring module has a positive stiffness spring arranged in parallel with a negative stiffness spring;
    wherein the positive stiffness spring is a Belleville spring segment and the negative stiffness spring is a buckling beam segment.

2. The strut assembly according to claim 1, wherein the elastic unit includes a plurality of spring modules arranged in a stack and interspaced along the strut assembly.

3. The strut assembly according to claim 2, wherein, in the stack of the plurality of spring modules, adjacent Belleville spring segments are arranged in contact with one another and transfer forces between adjacent spring modules.

4. The strut assembly according to claim 1, wherein, in the at least one spring module, the Belleville spring segment is secured to the buckling beam segment.

5. The strut assembly according to claim 4, wherein each of the Belleville spring segment and the buckling beam segment is defined by a respective external diameter, wherein the Belleville spring segment and the buckling beam segment are spaced apart and secured to one another at the respective external diameters.

6. The strut assembly according to claim 1, further comprising a housing, wherein the at least one spring module includes an annular bracket configured to secure the Belleville spring segment and the buckling beam segment at their respective external diameters, and wherein the housing is configured to guide the annular bracket.

7. The strut assembly according to claim 6, wherein the buckling beam segment includes an outer ring portion defined by the respective external diameter and an inner ring portion connected by a plurality of buckling beam elements, and wherein the Belleville spring segment includes Belleville spring fingers in contact with and configured to slide with respect to the inner ring portion.

8. The strut assembly according to claim 7, further comprising a rod configured to actuate the damper, wherein;
    the inner ring portion of the buckling beam segment defines an aperture; and
    the rod extends through the aperture.

9. The strut assembly according to claim 7, wherein the buckling beam segment includes two adjacent beams having respective bends configured to oppose one another and counter a positive stiffness of the Belleville spring segment.

10. A vehicle comprising:
    a vehicle body;
    a road wheel configured to maintain contact with a road surface; and
    a suspension corner connecting the road wheel to the vehicle body and configured to maintain contact between the road wheel and the road surface and provide isolation of vibration between the road wheel and the vehicle body, wherein the suspension corner includes an elastic unit having at least one spring module having a positive stiffness spring arranged in parallel with a negative stiffness spring and configured to suspend the vehicle body relative to the road wheel;
    wherein the positive stiffness spring is a Belleville spring segment and the negative stiffness spring is a buckling beam segment.

11. The vehicle according to claim 10, wherein the suspension corner additionally includes a strut assembly configured to attach the road wheel to the vehicle body, and wherein the elastic unit is configured as an integral component of the strut assembly.

12. The vehicle according to claim 10, wherein the elastic unit includes a plurality of spring modules arranged in a stack and interspaced along the strut assembly.

13. The vehicle according to claim 12, wherein, in the stack of the plurality of spring modules, adjacent Belleville spring segments are arranged in contact with one another and transfer forces between adjacent spring modules.

14. The vehicle according to claim 10, wherein, in the at least one spring module, the Belleville spring segment is secured to the buckling beam segment.

15. The vehicle according to claim 14, wherein each of the Belleville spring segment and the buckling beam segment is defined by a respective external diameter, wherein the Belleville spring segment and the buckling beam segment are spaced apart and secured to one another at the respective external diameters.

16. The vehicle according to claim 10, wherein:
the strut assembly includes a housing;
the at least one spring module includes an annular bracket configured to secure the Belleville spring segment and the buckling beam segment at their respective external diameters; and
the housing is configured to guide the annular bracket.

17. The vehicle according to claim 16, wherein the buckling beam segment includes an outer ring portion defined by the respective external diameter and an inner ring portion connected by a plurality of buckling beam elements, and wherein the Belleville spring segment includes Belleville spring fingers in contact with and configured to slide with respect to the inner ring portion.

18. The vehicle according to claim 17, wherein:
the strut assembly includes a damper actuated by a rod;
the inner ring portion of the buckling beam segment defines an aperture; and
the rod extends through the aperture.

* * * * *